US010556190B2

United States Patent
Choi et al.

(10) Patent No.: US 10,556,190 B2
(45) Date of Patent: Feb. 11, 2020

(54) APPARATUS FOR GENERATING WATER VAPOR WITH HEAT-RETAINING MEDIUM AND FUEL CELL SYSTEM HAVING THE APPARATUS

(71) Applicant: MICO CO., LTD., Anseong-si, Gyeonggi-do (KR)

(72) Inventors: Song Ho Choi, Anseong-si (KR); Byoung-Chang Yang, Seoul (KR)

(73) Assignee: MICO CO., LTD., Anseong-si (KR)

( * ) Notice: Subject to any disclaimer, the term of this patent is extended or adjusted under 35 U.S.C. 154(b) by 149 days.

(21) Appl. No.: 15/567,049

(22) PCT Filed: Feb. 17, 2016

(86) PCT No.: PCT/KR2016/001572
§ 371 (c)(1),
(2) Date: Oct. 16, 2017

(87) PCT Pub. No.: WO2016/167461
PCT Pub. Date: Oct. 20, 2016

(65) Prior Publication Data
US 2018/0126296 A1    May 10, 2018

(30) Foreign Application Priority Data

Apr. 17, 2015    (KR) .................. 10-2015-0054309

(51) Int. Cl.
*B01B 1/00*        (2006.01)
*H01M 8/0612*    (2016.01)
(Continued)

(52) U.S. Cl.
CPC ............. *B01B 1/005* (2013.01); *B01J 19/24* (2013.01); *C01B 3/34* (2013.01); *H01M 8/0618* (2013.01);
(Continued)

(58) Field of Classification Search
CPC ...... C01B 2203/066; C01B 2203/1288; C01B 2203/0894
See application file for complete search history.

(56) References Cited

U.S. PATENT DOCUMENTS 6,120,925 A * 9/2000 Kawatsu ................ C01B 3/583
429/412
6,485,853 B1 * 11/2002 Pettit .................... H01M 8/0612
429/412
(Continued)

FOREIGN PATENT DOCUMENTS

JP    2000-319002    11/2000
JP    2004-071242    3/2004
(Continued)

OTHER PUBLICATIONS

International Search Report and Written Opinion issued in Application No. PCT/KR2016/001572, dated Apr. 1, 2016.
(Continued)

*Primary Examiner* — Imran Akram
(74) *Attorney, Agent, or Firm* — Norton Rose Fulbright US LLP

(57) ABSTRACT

A water-vapor generating apparatus used for reforming a hydrocarbon fuel is disclosed. The water-vapor generating apparatus includes a chamber body; a partitioning member to divide a space defined in the chamber body into a water-vapor discharge space and a heating space; a tubular pipe having a first opened end in water-communication with an external water-supply apparatus and a second opened end in vapor-communication with the water-vapor discharge space, wherein the tubular pipe extends through the heating space; and a heater configured to supply thermal energy to the heating space. Such a water-vapor generating apparatus may supply water-vapor, in a stable and uniform manner, to a fuel reforming apparatus.

13 Claims, 2 Drawing Sheets

(51) Int. Cl.
*C01B 3/34* (2006.01)
*B01J 19/24* (2006.01)

(52) U.S. Cl.
CPC ... *B01J 2219/24* (2013.01); *C01B 2203/0216* (2013.01); *C01B 2203/066* (2013.01)

(56) References Cited

U.S. PATENT DOCUMENTS

| | | | | |
|---|---|---|---|---|
| 6,531,102 | B1* | 3/2003 | Nakamura | B01B 1/005 422/198 |
| 2002/0170504 | A1* | 11/2002 | Kasahara | B01B 1/005 122/40 |
| 2003/0167689 | A1* | 9/2003 | Hsu | B01B 1/005 48/61 |
| 2007/0273052 | A1* | 11/2007 | Schmidt | F23D 3/22 261/101 |
| 2008/0197318 | A1* | 8/2008 | Morita | C09K 5/10 252/74 |
| 2009/0087705 | A1* | 4/2009 | Fuju | C01B 3/384 429/424 |
| 2009/0258263 | A1* | 10/2009 | Fujioka | B01J 8/0257 429/425 |
| 2011/0086281 | A1* | 4/2011 | Huber | C01B 3/32 429/423 |
| 2012/0321971 | A1* | 12/2012 | Maenishi | C01B 3/384 429/412 |
| 2014/0093800 | A1* | 4/2014 | Sato | C01B 3/384 429/425 |
| 2016/0372772 | A1* | 12/2016 | Hirakawa | B01J 7/02 |

FOREIGN PATENT DOCUMENTS

| | | |
|---|---|---|
| KR | 10-2006-0095110 | 8/2006 |
| KR | 10-2008-0078142 | 8/2008 |
| KR | 10-2014-0082240 | 7/2014 |

OTHER PUBLICATIONS

International Preliminary Report on Patentability issued in Application No. PCT/KR2016/001572, dated Oct. 17, 2017.

* cited by examiner

[FIG. 1]
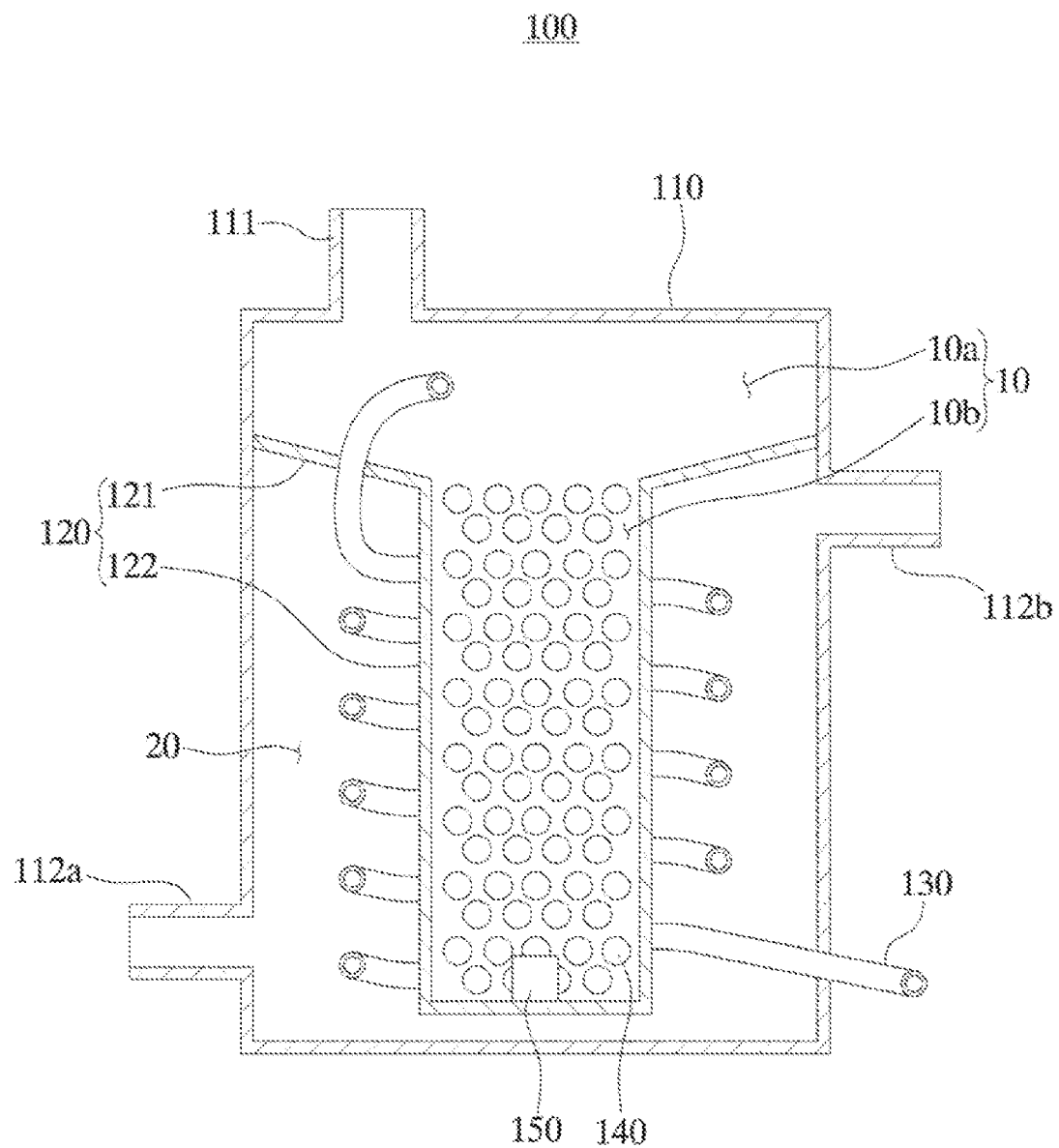

[FIG. 2]
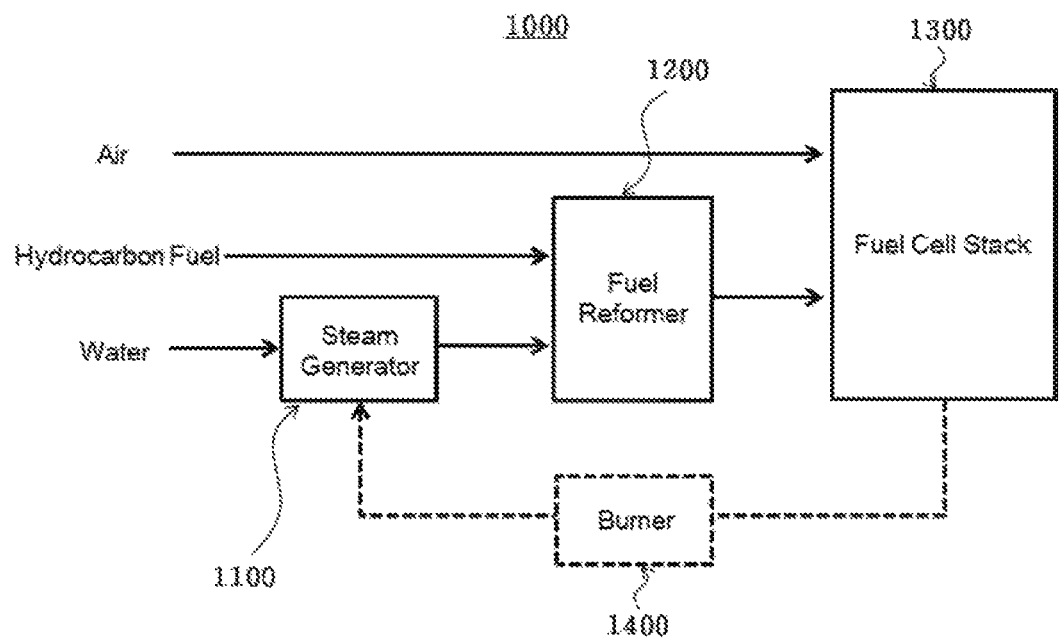

APPARATUS FOR GENERATING WATER VAPOR WITH HEAT-RETAINING MEDIUM AND FUEL CELL SYSTEM HAVING THE APPARATUS

CROSS-REFERENCE TO RELATED APPLICATION

This application is a national phase application under 35 U.S.C. § 371 of International Application No. PCT/KR2016/001572 filed Feb. 17, 2016, which claims the benefit of Korean patent application No. 10-2015-0054309 filed on Apr. 17, 2015, the entire contents of each of the above-referenced applications are incorporated herein by reference for all purposes as if fully set forth herein.

BACKGROUND

Field of the Present Disclosure

The present disclosure relates to a water-vapor generating apparatus for stably supplying water-vapor to a fuel reforming apparatus for reforming hydrocarbon fuel, and a fuel cell system including the same.

Discussion of Related Art

The fuel cell uses reaction between hydrogen and oxygen to generate electricity. When these fuel cells use hydrogen directly, they are the most efficient. However, for this purpose, installing a hydrogen storage tank directly at the location where the fuel cell is installed, which poses a safety problem. Therefore, currently, reforming the hydrocarbon fuel produces hydrogen, and the hydrogen thus produced is used as fuel for the fuel cell.

As a method of reforming such a hydrocarbon fuel, a water-vapor reforming method of generating hydrogen by reacting water-vapor and hydrocarbon fuel is mainly used. In this water-vapor reforming method, hydrogen, carbon monoxide and carbon dioxide are mainly produced by the reaction between the water vapor and the hydrocarbon fuel, and, then, these gases are supplied as fuel gas to the fuel cell.

However, in this water-vapor reforming method, when the amount of water vapor is lower than the amount of the hydrocarbon fuel or the reaction temperature is lowered, there is a problem that carbon (C) which can abruptly damage the electrode of the fuel cell is generated due to the reaction therebetween. Therefore, in order to prevent the generation of such carbon (C), the water-vapor should be stably and uniformly supplied to the fuel reforming apparatus in which the reaction between the hydrocarbon fuel and the water-vapor occurs.

SUMMARY

The purpose of the present disclosure is to provide a water-vapor generating apparatus capable of providing a steady and uniform supply of water vapor to a fuel reforming apparatus.

Another object of the present disclosure is to provide a fuel cell system comprising the water-vapor generating apparatus.

In a first aspect of the present disclosure, there is provided a water-vapor generating apparatus for use with a hydrocarbon-fuel reforming apparatus, wherein the water-vapor generating apparatus comprises: a chamber body having an inner space defined therein; a partitioning member disposed within the inner space of the chamber body and configured to divide the inner space into a water-vapor discharge space and a heating space; a tubular pipe having a first opened end in water-communication with an external water-supply apparatus and a second opened end in vapor-communication with the water-vapor discharge space, wherein the tubular pipe extends through the heating space; and a heater configured to supply thermal energy to the heating space, wherein the chamber body has a water-vapor outlet defined therein to enable vapor-communication between the water-vapor discharge space and the fuel reforming apparatus.

In one embodiment of the first aspect, the heater includes a hot-gas supply apparatus configured to supply hot-gas to the heating space, wherein the chamber has: a gas inlet defined therein through which the hot-gas is injected from the hot-gas supply apparatus into the heating space; and a gas outlet defined therein through which the hot-gas is discharged from the heating space out of the heating space. In one embodiment of the first aspect, the heater includes an electro-thermal heater disposed in a side wall of the chamber body, wherein the side wall defines the heating space therein.

In one embodiment of the first aspect, the water-vapor generating apparatus further comprises a heat-retaining medium disposed in the water-vapor discharge space, the heat-retaining medium being made of a material having specific heat greater than a material of the chamber body and a material of the partitioning member. In one embodiment of the first aspect, the heat-retaining medium includes a plurality of beads or has a foam or mesh structure.

In one embodiment of the first aspect, the water-vapor discharge space includes a first sub-space in vapor-communication with the water-vapor outlet and a second sub-space disposed below the first sub-space, wherein the second sub-space contains therein the heat-retaining medium, wherein a top of the second sub-space is in communication with the first sub-space, wherein lateral and bottom portions of the second sub-space are surrounded by the heating space.

In one embodiment of the first aspect, the partitioning member includes: a first partitioning sub-member having an opening formed therein, wherein the first partitioning sub-member is coupled to the chamber body and is configured to partition between the first sub-space and the heating space; and a second partitioning sub-member extending downward from the first partitioning sub-member, wherein the second partitioning sub-member is configured to define the second sub-space therein, and to partition between the second sub-space and the heating space. In one embodiment of the first aspect, an upper surface of the first partitioning sub-member extends to be tilted downwards toward the second space so that liquid water dropped on the upper surface of the first partitioning sub-member moves toward the second space via a gravity.

In one embodiment of the first aspect, the water-vapor generating apparatus further comprises a liquid-water detector disposed within the second space to sense liquid water present in the second space. In one embodiment of the first aspect, the liquid-water detector includes a temperature sensor or a liquid sensor disposed in the second space.

In one embodiment of the first aspect 9, wherein the tubular pipe extends, in the heating space, in a form of a coil surrounding the second space.

In a second aspect of the present disclosure, there is provided a fuel cell system comprising: a water-vapor generating apparatus configured to convert liquid water supplied from a water-supply apparatus into water-vapor; a fuel reforming apparatus configured to generate a fuel gas containing hydrogen by reacting the water-vapor supplied from the water-vapor generating apparatus and hydrocarbon fuel with each other; and a fuel cell stack configured to generate electricity using the fuel gas supplied from the fuel reforming apparatus and air supplied from an external air supply apparatus, wherein the water-vapor generating apparatus comprises: a chamber body having an inner space defined therein; a partitioning member disposed within the inner space of the chamber body and configured to divide the inner space into a water-vapor discharge space and a heating space; a tubular pipe having a first opened end in water-communication with an external water-supply apparatus and a second opened end in vapor-communication with the water-vapor discharge space, wherein the tubular pipe extends through the heating space; and a heater configured to supply thermal energy to the heating space, wherein the chamber body has a water-vapor outlet defined therein to enable vapor-communication between the water-vapor discharge space and the fuel reforming apparatus.

According to the water-vapor generating apparatus and the fuel cell system including the water-vapor generating apparatus described above, the stability of the fuel cell system can be remarkably improved.

Specifically, instead of directly connecting the tubular pipe of the water-vapor generating apparatus to the fuel reforming apparatus, the tubular pipe of the water-vapor generating apparatus is connected to the fuel reforming apparatus through the water-vapor discharge space of the chamber. In this way, in addition to being able to uniformly supply the water-vapor to the fuel reforming apparatus, the liquid water in the tubular pipe not converted to the water-vapor due to abnormal conditions such as a decrease in the temperature of the hot-gas or failure of the heater may be prevented from being supplied to the fuel reforming apparatus.

Further, by placing the heat-retaining medium in the water-vapor discharge space of the chamber, the liquid water supplied to the water-vapor discharge space in the abnormal conditions such as a decrease in the temperature of the hot-gas or failure of the heater may be converted into water-vapor, using the heat energy stored in the heat-retaining medium.

In addition, by installing the liquid-water detector in the water-vapor discharge space of the chamber, it is possible to early confirm the occurrence of the abnormal situations such as a decrease in the temperature of the hot-gas or failure of the heater.

BRIEF DESCRIPTION OF THE DRAWINGS

FIG. 1 is a cross-sectional view illustrating a water-vapor generating apparatus according to an embodiment of the present disclosure.

FIG. 2 is a view for illustrating a fuel cell system according to an embodiment of the present disclosure.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

<Water-Vapor Generating Apparatus>

FIG. 1 is a cross-sectional view illustrating a water-vapor generating apparatus according to an embodiment of the present disclosure.

Referring to FIG. 1, a water-vapor generating apparatus 100 according to an embodiment of the present disclosure may be configured to supply a water-vapor to a fuel reforming apparatus (1200 in FIG. 2) that produces hydrogen required for the reaction of the fuel cell from hydrocarbon fuels containing chemically hydrogen, such as methane ($CH_4$), ethane ($C_2H_6$), propane ($C_3H_8$), butane ($C_4H_{10}$), natural gas, coal gas, etc. In one embodiment, when methane ($CH_4$) is supplied as the hydrocarbon fuel, the fuel reforming apparatus 1200 may be configured to enable reaction between the methane and water-vapor supplied from the water-vapor generating apparatus (100 in FIGS. 1 and 1100 in FIG. 2) to generate the hydrogen based on a following chemical reaction 1:

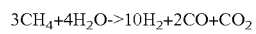  [Chemical Reaction 1]

Along with this reaction, a side reaction for generating carbon (C) may occur as in the following chemical reaction 2, depending on the reaction temperature inside the fuel reforming apparatus, and the ratio between the water-vapor amount and the carbon amount. When the generated carbon is supplied to the fuel cell stack (1300 in FIG. 2), the electrode of the fuel cell may be damaged and the performance of the fuel cell may be drastically deteriorated. Therefore, in order to suppress the carbon-generating side reaction, the water-vapor should be stably supplied to the fuel reforming apparatus.

$$2CO \to C+CO_2 \qquad \text{[Chemical reaction 2]}$$

The water-vapor generating apparatus 100 according to an embodiment of the present disclosure may include a chamber 110, a partitioning member 120, a tubular pipe 130, and a heater (not shown).

The chamber 110 may have an inner space 10, 20 defined therein. The partitioning member 120 is disposed inside the chamber 110 to divide the inner space 10 and 20 of the chamber 110 into two spaces, that is, a water-vapor discharge space 10 and a heating space 20. Further, a water-vapor outlet in for discharging water-vapor may be formed in a portion of the chamber 110 where the water-vapor discharge space 10 is defined. This water-vapor outlet 111 may communicate with the fuel reforming apparatus (1200 of FIG. 2).

The chamber 110 and the partitioning member 120 may be made of a stable material at a high temperature. For example, each of the chamber 110 and the partitioning member 120 may be made of a material including a metal, an alloy, a ceramic, a metal composite, and a composite of metal and ceramic, which are stable at high temperatures. Meanwhile, the chamber 110 and the partitioning member 120 may be made of the same material or different materials.

The tubular pipe 130 has a first end connected to an external water-supply apparatus (not shown) outside the chamber 110 and a second end positioned in the water-vapor discharge space 10. The tubular pipe 130 may extend through the heating space 20 and then to the water-vapor discharge space 10. When the tubular pipe 130 is installed as described above, water supplied to the tubular pipe 130 from the external water-supply apparatus is converted into water-vapor while moving in the heating space 20. The converted water-vapor may be discharged into the water-vapor discharge space (10). Further, water-vapor discharged from the tubular pipe 130 into the water-vapor discharge space 10 may be supplied to the fuel reforming apparatus (1200 in FIG. 2) through the water-vapor outlet 111.

The heater (not shown) may supply thermal energy to the heating space 20 to convert the water moving through the tubular pipe 130 into water-vapor.

In one embodiment, the heater may include a hot-gas supply apparatus (1400 in FIG. 2) for supplying hot gas to the heating space. In this case, one portion of the chamber 110 in which the heating space 20 is defined is provided with a gas inlet 112a through which hot gas is injected from the hot-gas supply apparatus 1400 thereto while the other portion of the chamber 110 in which the heating space 20 is defined is provided with a gas outlet 112b for discharging the gas. As long as the temperature of the heating space 20 is raised by a hot-gas, the hot-gas is not particularly limited. For example, the hot gas may be a gas discharged from the fuel cell stack (1300 in FIG. 2). That is, the heater may be configured to combust the gas discharged from the fuel cell stack using a combustor (1400 in FIG. 2) and to supply the combusted hot gas to the heating space 20 through a blower.

In another embodiment, the heater may include an electro-thermal heater disposed in the sidewall of the chamber 110 defining the heating space 20.

The tubular pipe 130 is connected to the fuel reforming apparatus through the water-vapor discharge space 10 of the chamber 110 instead of directly connecting the tubular pipe 130 to the fuel reforming apparatus 1200 in FIG. 2. In this case, not only may the water-vapor be uniformly supplied to the fuel reforming apparatus (1200 of FIG. 2), but also, liquid water that has not been converted to water-vapor due to an abnormal situation such as a temperature decrease of the hot-gas or a heater failure may be prevented from being supplied to the fuel reforming apparatus (1200 of FIG. 2).

In general, an external water-supply apparatus (not shown) supplies water to the tubular pipe 130 using a pumping apparatus. Therefore, when the tubular pipe 130 is directly connected to the fuel reforming apparatus 1200 (FIG. 2), the water-vapor supplied to the fuel reforming apparatus (1200 in FIG. 2) is non-uniformly supplied due to the pulsation of the pumping apparatus. However, according to one embodiment of the present disclosure, when the tubular pipe 130 is connected to the fuel reforming apparatus (1200 of FIG. 2) via the water-vapor discharge space 10 of the chamber 110, water-vapor may be more uniformly supplied to the fuel reforming apparatus 1200 (FIG. 2) since the water-vapor discharge space 10 functions to mitigate the pulsation of the pumping apparatus.

Further, when the tubular pipe 130 is directly connected to the fuel reforming apparatus 1200 (FIG. 2), liquid water may be directly supplied to the fuel reforming apparatus (1200 in FIG. 2) due to abnormal conditions such as a decrease in the temperature of the hot gas or a failure of the heater. In this case, the amount of water vapor that may react with the hydrocarbon fuel is reduced, and the reaction temperature between the hydrocarbon fuel and the water vapor is lowered. As a result, excessive amount of carbon which may damage the electrode of the fuel cell, may be produced in the chemical reaction 2. On the other hand, according to the present disclosure, when the tubular pipe 130 is connected to the fuel reforming apparatus 1200 (FIG. 2) through the water-vapor discharge space 10 of the chamber 110, liquid water is not supplied to the fuel reforming apparatus 1200 of FIG. 2 since the liquid water is stored in the water-vapor discharge space 10 of the chamber 110.

The water-vapor generating apparatus 100 according to an embodiment of the present disclosure may include a heat-retaining medium 140 made of a material having a specific heat greater than that of the chamber 110 or the partitioning member 120. The heat-retaining medium 140 is disposed within the water-vapor discharge space 10.

The heat-retaining medium 140 may absorb thermal energy supplied to the heating space 20 of the chamber 110 and store the thermal energy therein. If liquid water is not converted into water-vapor in the tubular pipe 130 due to abnormal conditions such as a decrease in the temperature of the hot-gas or a failure of the heater, the liquid water supplied to the water-vapor discharge space 10 may be converted into water-vapor by using the heat energy stored in the heat-retaining medium 140.

In one embodiment, the heat-retaining medium 140 may include a ceramic, metal, or high temperature resistant polymer having a relatively high specific heat. The heat-retaining medium 140 may be configured to include a plurality of beads to have a large contact area with the liquid water, or to have a foam or mesh structure to have a large contact area with the liquid water.

Thus, when the heat-retaining medium 140 is disposed in the water-vapor discharge space 10, the water-vapor discharge space 10 includes a first space boa directly connected to the water-vapor outlet 111, and a second space 10b located below the first space boa, and in which the heat-retaining medium 140 is disposed. In order to effectively supply the heat provided to the heating space 20 to the heat-retaining medium 140 disposed in the second space 10b, an upper portion of the second space 10b is connected to the first space boa, and a lateral portion and/or bottom portion of the second space 10b is surrounded by the heating space 20. Thus, the shape of the second space 10b is not particularly limited as long as the shape may accommodate the heat-retaining medium 140 therein and can effectively receive thermal energy from the heating space 20. For example, the second space 10b may have a cylindrical, square, conical, or quadrangular pyramid shape having a lateral portion and/or bottom portion surrounded by the heating space 20 or may have other various irregular shapes.

In one embodiment, in order to define the first space 10 and the second space 20, the partitioning member 120 includes a first partitioning sub-member 121 and a second partitioning sub-member 122. The first partitioning sub-member 121 has an opening of a predetermined shape defined therein and is coupled to a side wall of the chamber 110 to partition between the first space boa and the heating space 20. The second partitioning sub-member 122 extends downward from the first partitioning sub-member 121 to define the second space 10b and to partition between the second space bob and the heating space 20. In one embodiment, in order to move the liquid water dropped on the top surface of the first partitioning sub-member 121 toward the second space 10b by gravity, the top surface of the first partitioning sub-member 121 may be formed to be inclined toward the second space 10b.

On the other hand, the water-vapor generating apparatus boo according to an embodiment of the present disclosure includes a liquid-water detector 150 (not shown) disposed in the second space 10b and capable of sensing liquid water present in the second space 10b. If liquid water is not converted into water vapor in the tubular pipe 130 due to an abnormal situation such as a decrease in the temperature of the hot gas or a failure of the heater, the water vapor generated using the thermal energy stored in the retaining medium 140 may be supplied to the fuel reforming apparatus (1200 in FIG. 2). However, after a certain period of time, the heat-retaining medium 140 is cooled and, thus, liquid water rather than water-vapor may be fed to the fuel reforming apparatus 1200 (FIG. 2). Accordingly, when not water-vapor but the liquid water is supplied to the fuel reforming apparatus (1200 of FIG. 2), a large amount of carbon that damages the electrode of the fuel cell may be generated as described above. In this connection, the liquid-water detector 150 senses the liquid water present in the second space 10b, thereby notifying the occurrence of the abnormal condition as described above. This makes it possible to remarkably improve the stability of the fuel cell system.

The configuration of the liquid-water detector 150 is not particularly limited as long as the configuration thereof can sense the liquid water present in the second space 10b. For example, the liquid-water detector 150 may include a temperature sensor capable of measuring the temperature of the second space 10b, a liquid sensor capable of sensing the liquid present in the second space 10b, and the like.

The structure of the tubular pipe 130 disposed in the heating space 20 is not particularly limited as long as the structure thereof may allow the liquid water to be converted into water vapor using the heat energy supplied to the heating space 20. In one embodiment, when the water-vapor discharge space 10 comprises the first space boa and second space 10b as described above, the portion of the tubular pipe 130 disposed within the heating space 20 may be configured in the form of a coil surrounding the second space 10b to increase the heat exchange area.

<Fuel Cell System>

FIG. 2 is a diagram illustrating a fuel cell system according to an embodiment of the present disclosure.

Referring to FIG. 2, the fuel cell system 1000 according to an embodiment of the present disclosure may include a water-vapor generating apparatus 1100, a fuel reforming apparatus 1200, and a fuel cell stack 1300.

The water-vapor generating apparatus 1100 may be configured to receive liquid water from the external water-supply apparatus (not shown), to convert the liquid water into water-vapor, and to supply the water-vapor to the fuel reforming apparatus 1200. The water-vapor generating apparatus 1100 is implemented as the water-vapor generating apparatus 100 described with reference to FIG. 1. Thus, a detailed description thereof will be omitted.

The fuel reforming apparatus 1200 generates a fuel gas containing hydrogen by reacting the hydrocarbon fuel supplied from an external fuel supply apparatus (not shown) and water-vapor supplied from the water-vapor generating apparatus 1100. This fuel reforming apparatus 1200 may be implemented as a known or future fuel reforming apparatus. However, the present invention is not limited to this. A detailed description thereof will be omitted.

The fuel cell stack 1300 may be configured to generate electricity using hydrogen in the fuel gas provided from the fuel reforming apparatus 1200 and oxygen in the air supplied from an external air supply apparatus (not shown). The fuel cell stack 1300 includes, but is not limited to, a solid oxide fuel cell stack, a solid polymer fuel cell stack, a phosphoric acid fuel cell stack, and a molten carbonate fuel cell stack.

Meanwhile, as for the fuel cell system 1000 according to an embodiment of the present disclosure, the heater of the water-vapor generating apparatus 1100 may include a combustor 1400 as shown in FIG. 2.

The combustor 1400 may supply the hot gas to the heating space 20 of the water-vapor generating apparatus 1100 by combusting the gas discharged from the fuel cell stack 1300. Moreover, the combustor 1400 may supply the fuel reforming apparatus 1200 with thermal energy necessary for the reaction between the hydrocarbon fuel and the water-vapor. As the combustor 1400, a known combustion apparatus may be applied without limitation.

According to the water-vapor generating apparatus and the fuel cell system including the water-vapor generating apparatus described above, the stability of the fuel cell system can be remarkably improved.

Specifically, instead of directly connecting the tubular pipe of the water-vapor generating apparatus to the fuel reforming apparatus, the tubular pipe of the water-vapor generating apparatus is connected to the fuel reforming apparatus through the water-vapor discharge space of the chamber. In this way, in addition to being able to uniformly supply the water-vapor to the fuel reforming apparatus, the liquid water in the tubular pipe not converted to the water-vapor due to abnormal conditions such as a decrease in the temperature of the hot-gas or failure of the heater may be prevented from being supplied to the fuel reforming apparatus.

Further, by placing the heat-retaining medium in the water-vapor discharge space of the chamber, the liquid water supplied to the water-vapor discharge space in the abnormal conditions such as a decrease in the temperature of the hot-gas or failure of the heater may be converted into water-vapor, using the heat energy stored in the heat-retaining medium.

In addition, by installing the liquid-water detector in the water-vapor discharge space of the chamber, it is possible to early confirm the occurrence of the abnormal situations such as a decrease in the temperature of the hot-gas or failure of the heater.

While the foregoing is directed to preferred embodiments of the present disclosure, those skilled in the art will appreciate that various modifications and variations of the present disclosure may be made without departing from the spirit and scope of the present disclosure as set forth in the following claims.

What is claimed is:

1. A water-vapor generating apparatus comprises:
   a chamber body having an inner space defined therein;
   a partitioning member disposed within the inner space of the chamber body and configured to divide the inner space into a water-vapor discharge space and a heating space;
   a tubular pipe having a first opened end connected to an external water-supply apparatus and a second opened end disposed in the water-vapor discharge space, wherein the tubular pipe extends through the heating space;
   a heater configured to supply thermal energy to the heating space; and
   a heat-retaining medium disposed in the water-vapor discharge space, the heat retaining medium comprising a material having a specific heat greater than that of the chamber body and the partitioning member and configured to absorb thermal energy and convert liquid water into water-vapor with the absorbed thermal energy,
   wherein the chamber body has a water-vapor outlet connecting the water-vapor discharge space to a fuel reforming apparatus.

2. The apparatus of claim 1, wherein the heater comprises a hot-gas supply apparatus configured to supply hot-gas to the heating space,
   wherein the chamber comprises a gas inlet through which the hot-gas is injected from the hot-gas supply apparatus into the heating space; and a gas outlet through which the hot-gas in the heating space is discharged into an outside of the heating space.

3. The apparatus of claim 1, wherein the heater comprises an electro-thermal heater disposed on a side wall of the chamber body defining the heating space therein.

4. The apparatus of claim 1, wherein the heat-retaining medium comprises a plurality of beads or a medium having a foam or mesh structure.

5. The apparatus of claim 1, wherein the water-vapor discharge space comprises a first sub-space to which the water-vapor outlet is connected and a second sub-space disposed below the first sub-space, the second sub-space receiving the heat-retaining medium, wherein a top portion of the second subspace is in communication with the first sub-space and lateral and bottom portions of the second sub-space are surrounded by the heating space.

6. The apparatus of claim 5, wherein the partitioning member comprises:
   a first partitioning sub-member coupled to the chamber body and configured to partition between the first sub-space and the heating space, the first partitioning sub-member having an opening formed therethrough; and
   a second partitioning sub-member extending downward from the opening of the first partitioning sub-member, the second partitioning sub-member being configured to define the second sub-space therein, and to partition between the second sub-space and the heating space.

7. The apparatus of claim 6, wherein an upper surface of the first partitioning sub-member extends to be tilted downwards toward the second space so that liquid water dropped on the upper surface of the first partitioning sub-member moves toward the second space via a gravity.

8. The apparatus of claim 5, wherein the water-vapor generating apparatus further comprises a liquid-water detector disposed within the second space to sense liquid water present in the second space.

9. The apparatus of claim 8, wherein the liquid-water detector comprises a temperature sensor or a liquid sensor disposed in the second space.

10. The apparatus of claim 5, wherein the tubular pipe disposed in the heating space extends in a form of a coil surrounding the second space.

11. A fuel cell system comprising:
    a water-vapor generating apparatus configured to convert liquid water supplied from a water-supply apparatus into water-vapor;
    a fuel reforming apparatus configured to generate a fuel gas containing hydrogen by reacting hydrocarbon fuel with the water-vapor supplied from the water-vapor generating apparatus; and
    a fuel cell stack configured to generate electricity using the fuel gas supplied from the fuel reforming apparatus and air supplied from an external air supply apparatus,
    wherein the water-vapor generating apparatus comprises:
      a chamber body having an inner space defined therein;
      a partitioning member disposed within the inner space of the chamber body and configured to divide the inner space into a water-vapor discharge space and a heating space;
      a tubular pipe having a first opened end connected to an external water-supply apparatus and a second opened end disposed in the water-vapor discharge space, wherein the tubular pipe extends through the heating space;
      a heater configured to supply thermal energy to the heating space; and
      a heat-retaining medium disposed in the water-vapor discharge space, the heat retaining medium comprising a material having a specific heat greater than that of the chamber body and the partitioning member and configured to absorb thermal energy and convert liquid water into water-vapor with the absorbed thermal energy,
      wherein the chamber body has a water-vapor outlet connecting the water-vapor discharge space to the fuel reforming apparatus.

12. The system of claim 11, wherein the heater comprises a combustor configured to combust gas discharged from the fuel cell stack and to supply the combusted gas to the heating space.

13. The system of claim 11, wherein the water-vapor generating apparatus further comprises a liquid-water detector disposed within the water-vapor discharge space to sense liquid water present in the water-vapor discharge space.

* * * * *